(12) United States Patent
Couronne et al.

(10) Patent No.: US 8,290,607 B2
(45) Date of Patent: Oct. 16, 2012

(54) PLANNING METHOD AND SYSTEM FOR OPTIMIZING STOCK AND PRODUCTION PLAN IN BATCH PROCESS INDUSTRY

(75) Inventors: Philippe Couronne, Roquefort les Pins (FR); Filippo Focacci, Paris (FR); Frederic Paulin, Vincennes (FR)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 12/603,975

(22) Filed: Oct. 22, 2009

(65) Prior Publication Data
US 2011/0098834 A1    Apr. 28, 2011

(51) Int. Cl.
*G06F 19/00*    (2011.01)
(52) U.S. Cl. ............. 700/100; 700/107; 705/22; 705/28
(58) Field of Classification Search .................. 700/100, 700/95, 107; 705/22, 28
See application file for complete search history.

(56) References Cited

U.S. PATENT DOCUMENTS

| | | | |
|---|---|---|---|
| 5,630,070 A * | 5/1997 | Dietrich et al. | 705/7.23 |
| 5,771,172 A * | 6/1998 | Yamamoto et al. | 700/106 |
| 5,819,232 A * | 10/1998 | Shipman | 705/7.24 |
| 5,854,746 A * | 12/1998 | Yamamoto et al. | 700/106 |
| 5,897,624 A * | 4/1999 | Ramaswamy | 705/28 |
| 5,914,878 A * | 6/1999 | Yamamoto et al. | 700/106 |
| 5,953,707 A * | 9/1999 | Huang et al. | 705/7.25 |
| 6,032,121 A * | 2/2000 | Dietrich et al. | 705/7.22 |
| 6,151,582 A * | 11/2000 | Huang et al. | 705/7.25 |
| 7,197,481 B1 * | 3/2007 | Yamamoto et al. | 705/28 |
| 7,225,040 B2 * | 5/2007 | Eller et al. | 700/100 |
| 7,660,730 B2 * | 2/2010 | Hosoda et al. | 705/7.25 |
| 7,668,761 B2 * | 2/2010 | Jenkins et al. | 705/28 |
| 7,774,225 B2 * | 8/2010 | Cargille et al. | 705/7.25 |
| 7,966,214 B2 * | 6/2011 | Denton et al. | 705/7.12 |
| 2002/0087227 A1 * | 7/2002 | Tozawa et al. | 700/95 |
| 2002/0188499 A1 * | 12/2002 | Jenkins et al. | 705/10 |
| 2003/0050817 A1 * | 3/2003 | Cargille et al. | 705/8 |
| 2003/0050870 A1 * | 3/2003 | Cargille et al. | 705/28 |
| 2003/0069786 A1 * | 4/2003 | Hoffman et al. | 705/14 |
| 2003/0074250 A1 * | 4/2003 | Burk | 705/10 |

(Continued)

OTHER PUBLICATIONS

"ILOG Plant PowerOps 3.1 Offers Industry-First Dynamic Safety Stock for true Demand-Driven Manufacturing", Pharmaceutical Online, Oct. 22, 2008, 2 pages.

(Continued)

*Primary Examiner* — Ramesh Patel
*Assistant Examiner* — Anthony Whittington
(74) *Attorney, Agent, or Firm* — Steven M. Greenberg, Esq.; Carey, Rodriguez, Greenberg & O'Keefe (57) ABSTRACT

The method provides a planning system where production plans and safety stocks are determined simultaneously, thus resulting in coupled target stock calculation and production plan. The closer the manufacturing process gets to the next production event, the lower the safety stock needs to be. In this approach, assumptions on the average production lead time—which might be wrong—do not need to be made. Indeed, if the production plan and the safety stock are simultaneously computed, it is clear when the next production is going to occur. As a result, production variability only needs to be considered in relation to the probability of unexpected events in manufacturing (e.g. a machine breakdown) as opposed to taking provision for variability of the production cycle due to situations that can be anticipated at the planning step.

15 Claims, 6 Drawing Sheets

U.S. PATENT DOCUMENTS

2003/0090722 A1* 5/2003 Eller et al. ............... 358/1.17
2005/0222888 A1* 10/2005 Hosoda et al. .................. 705/8

OTHER PUBLICATIONS

Brian Tinhan, "Demand-driven manufacturing gets software tools to make it real", Manufacturing Computer Solutions, Oct. 23, 2008, 1 page.

"Deux nouveautés majeures", Supply Chain Magazine, No. 30, Dec. 2008, p. 8, with English translation.

"ILOG plant powerops 3.1 offers industry-first dynamic safety stock for true demand-driven manufacturing", Oct. 22, 2008, 3 pages.

Filippo Focacci et al., "Warehouse Management Systems (WMS) Optimizing inventory—where to start?" Manufacturing & Logistics IT, Jan. 15, 2009, 3 pages.

* cited by examiner

PLANNING METHOD AND SYSTEM FOR OPTIMIZING STOCK AND PRODUCTION PLAN IN BATCH PROCESS INDUSTRY

FIELD

The present disclosure relates to the field of supply chain management, more particularly joint optimization of safety stock level and production plan in batch process industry.

BACKGROUND

One of the most important issues in the management of supply chains for maximizing the efficiency of a production line is the right size of inventory stock. When planning the production, manufacturers try to achieve several goals: reduction of working capital, reduction of the risk of inventory write-off and improvements in service levels. Part of the inventory represents cycle stock and is due to batch production: high changeover costs push manufacturers to produce in large batches thus creating high inventory. But part of this inventory is safety stock that enables manufacturers to manage demand, supply and manufacturing variability.

Simple formulas exist to compute the minimal inventory to guarantee a given service level, or a given fill rate. These safety stock levels are then fed into a production planning system that computes the production frequency of every product. When the production chain is organised according to periodic manufacturing steps, these state of the art safety stock calculations are providing a right balance between the requirements of ensuring the right stock when needed by the production, without an excessively big inventory. In most cases however these frequencies may vary during time and be far from the initial assumptions, thus invalidating the stock targets. This scenario could then lead to maintaining the wrong amount of inventory, resulting in both higher inventory levels than necessary and stock-outs which hurt service levels. This process, where safety stock calculations is independent from production plans, leads to safety stock levels based on averaged production frequency. When production planners understand that the average production frequency may be different than the realized production frequency, they compensate for the difference by producing more stock than necessary.

An explanation of state of the art safety stock calculation can be found in vanRyzin, Garrett, "Analyzing Cost and Service in Supply Chain", Columbia Business School, 2001, incorporated herein by reference in its entirety. In general, prior art systems which address this issue provides unsatisfactory results when the production process is characterized by possible change in frequency of manufacturing steps.

SUMMARY

In an embodiment, the present disclosure provides a method for managing stock and production plan according to appended independent claim 1.

According to some embodiments, the method of the present disclosure can help to solve the problem of the prior art by providing a more effective computation of safety stock necessary to manage variability based on actual time until the next production event. In such an approach, production plans and safety stocks are determined simultaneously, thus resulting in coupled target stock calculation and production plan. The closer the manufacturing process gets to the next production event, the lower the safety stock needs to be. In this approach, assumptions on the average production lead time—which might be wrong—do not need to be made. Indeed, if the production plan and the safety stock are simultaneously computed, it is clear when the next production is going to occur.

As a result, production variability only needs to be considered in relation to the probability of unexpected events in manufacturing (e.g. a machine breakdown) as opposed to taking provision for variability of the production cycle due to situations that can be anticipated at the planning step (e.g. a planned maintenance or a bank holiday, competition of many products at the same time in a production environment with limited capacity, bottlenecks).

In an embodiment of the present disclosure, a method is determined for a batch manufacturing process for optimizing a production plan of at least one material m and the target stock of the at least one material m to satisfy the forecast of customer demands, the production plan being divided into a plurality of contiguous time intervals t, the manufacturing process including a plurality of process activities, each activity producing a quantity $q_{m,T}$ of material m in a predetermined time interval T, the method including the steps of: defining for each at least one material m a set of N linear constraints $LC_{n,m}$, wherein $1<=n<=N$; defining for each at least one material m a set of linear equations, each linear equation representing a cost value $C_{z,m}$, wherein $1<=z<=Z$, each cost value indicative of a cost element of the manufacturing process, each linear equation being defined as a function of variable $q_{m,T}$; assigning to each cost value $C_{z,m}$ a weight $w_z$; determining the value of $q_{m,T}$ for each time interval t so that the weighted sum of cost values $C_{z,m}$ is minimized while the linear constraints are respected.

In a further embodiment of the present disclosure, a system comprising components adapted to implement the method above is provided.

In another embodiment a computer program is provided which realizes the method above when run on a computer.

BRIEF DESCRIPTION OF THE DRAWINGS

Embodiments of the disclosure will now be described, by way of example only, by reference to the accompanying drawings, in which.

DESCRIPTION OF EXAMPLE EMBODIMENTS

The present disclosure can be useful whenever changeovers are likely to occur. We consider that creating a production of a given product in a time bucket (or interval) where this production is not already planned is very costly. Changing the quantity of production of a given product in a time bucket where this production is already planned can be done at low cost.

According to an embodiment of the disclosure, the optimization of production is based on a mathematical model, typically a Mixed Integer-linear Program (MIP).

In Mixed Integer Programming, a linear cost function is minimized subject to linear equality and linear inequality constraints, where some of the variables may be integers or binaries. An explanation of MIP can be found e.g. in H. P. Williams, "Model Building in Mathematical Programming", Wiley.

The safety stock to maintain in each time bucket is in the traditional approach pre-computed and provided as input to the mathematical model. The cost function contains a term that penalizes the case where the planned inventory does not respect a minimum quantity. We call this minimum quantity the target stock. It is composed of the average of the demand forecast plus the safety stock. The target stock is thus input data, the computation of which is based on average lead time. The disclosure introduces the target stock as a decision variable. A set of linear equations increases or decreases the target stock for a product at the end of a given time bucket in function of the distance to the next time bucket when the product is planned to be produced.

Figure 1:
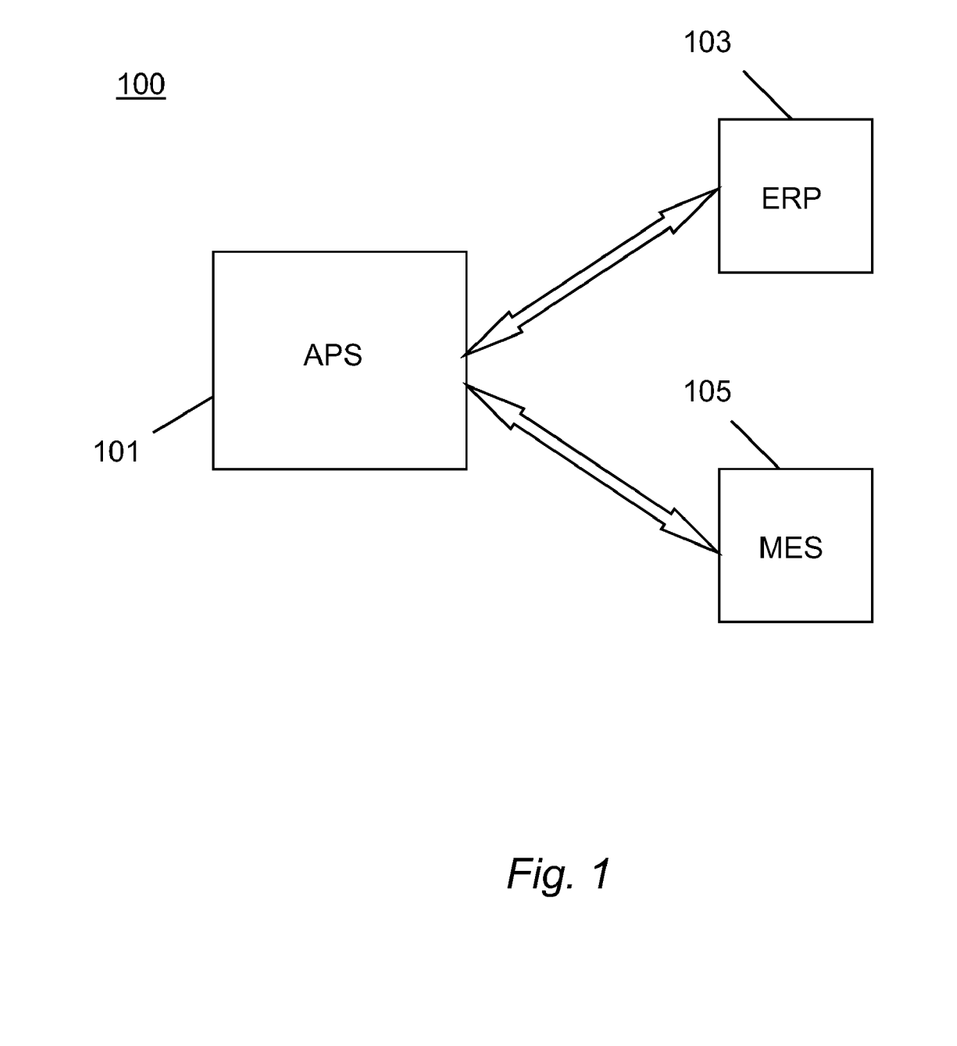
FIG. 1 is an example of an integrated planning system for a manufacturing plant to which the planning method of the present disclosure can be applied.

FIG. 1 shows a complete integrated manufacturing systems 100 where a planning application according to an embodiment of the present disclosure 101, interacts with an Enterprise Resource Planning (ERP) system 103 (e.g. SAP R/3, Oracle Applications), which manages the manufacturing data such as the materials, the equipments and the manufacturing process; and a Manufacturing Execution System (MES) 105 (e.g. SiView of International Business Machines Corp, Rockwell Automation, Siemens Simatic IT), which executes and monitors the work-in-progress on the factory floor.

Figure 2:
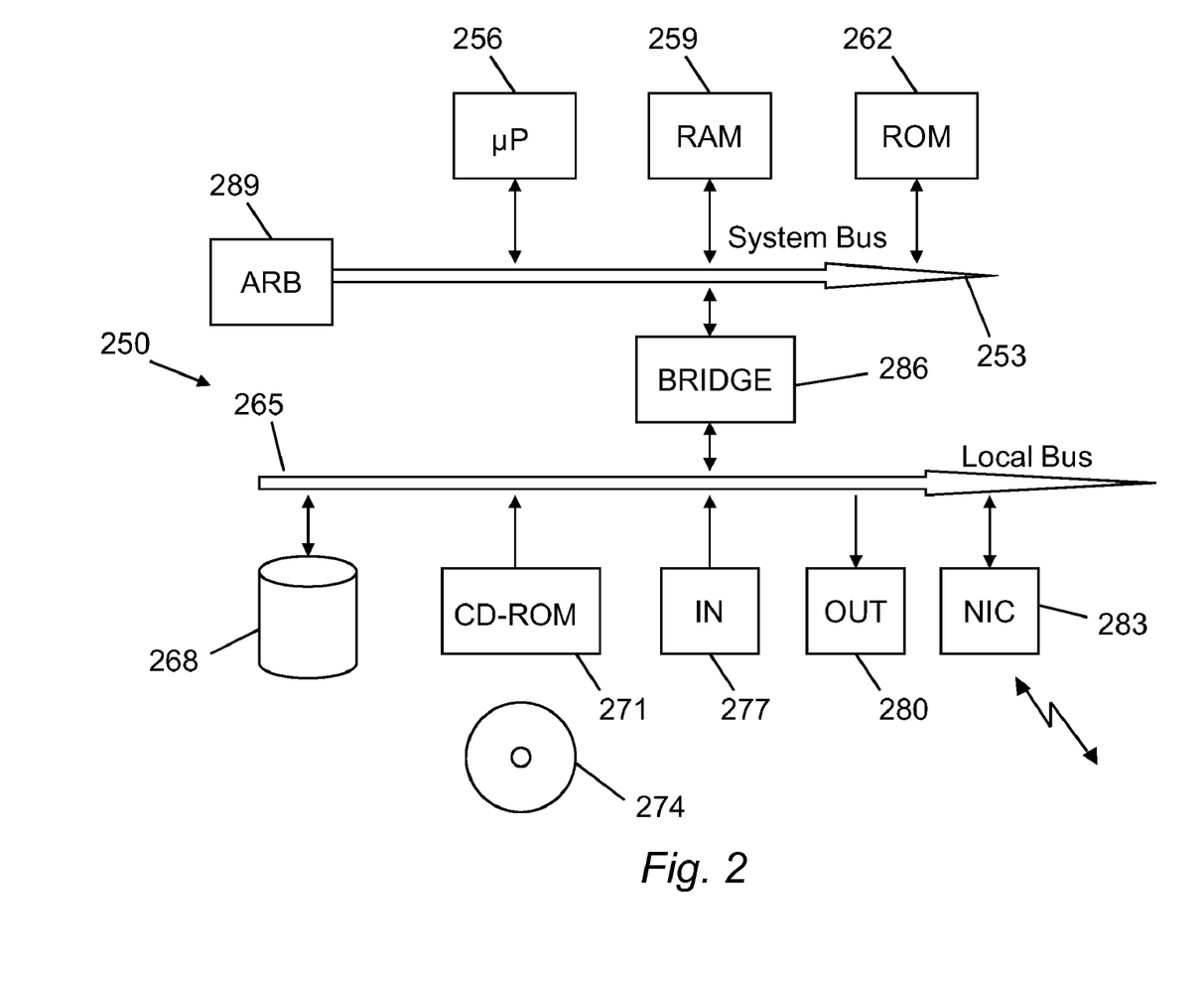
FIG. 2 is a diagram of a general computer system adapted to support the planning method of an embodiment of the present disclosure.

With reference to FIG. 2 a generic computer of the system (e.g. computer, planning and scheduling server, ERP server, MES server) is denoted with 250. The computer 250 is formed by several units that are connected in parallel to a system bus 253. In detail, one or more microprocessors 256 control operation of the computer 250; a RAM 259 is directly used as a working memory by the microprocessors 256, and a ROM 262 stores basic code for a bootstrap of the computer 250. Peripheral units are clustered around a local bus 265 (by means of respective interfaces). In particular, a mass memory consists of a hard-disk 268 and a drive 271 for reading CD-ROMs 274. Moreover, the computer 250 includes input devices 277 (for example, a keyboard and a mouse), and output devices 280 (for example, a monitor and a printer). A Network Interface Card 283 is used to connect the computer 250 to the network. A bridge unit 286 interfaces the system bus 253 with the local bus 265. Each microprocessor 256 and the bridge unit 286 can operate as master agents requesting an access to the system bus 253 for transmitting information. An arbiter 289 manages the granting of the access with mutual exclusion to the system bus 253. Similar considerations apply if the system has a different topology, or it is based on other networks. Alternatively, the computers have a different structure, include equivalent units, or consist of other data processing entities (such as PDAs, mobile phones, and the like).

Figure 3:
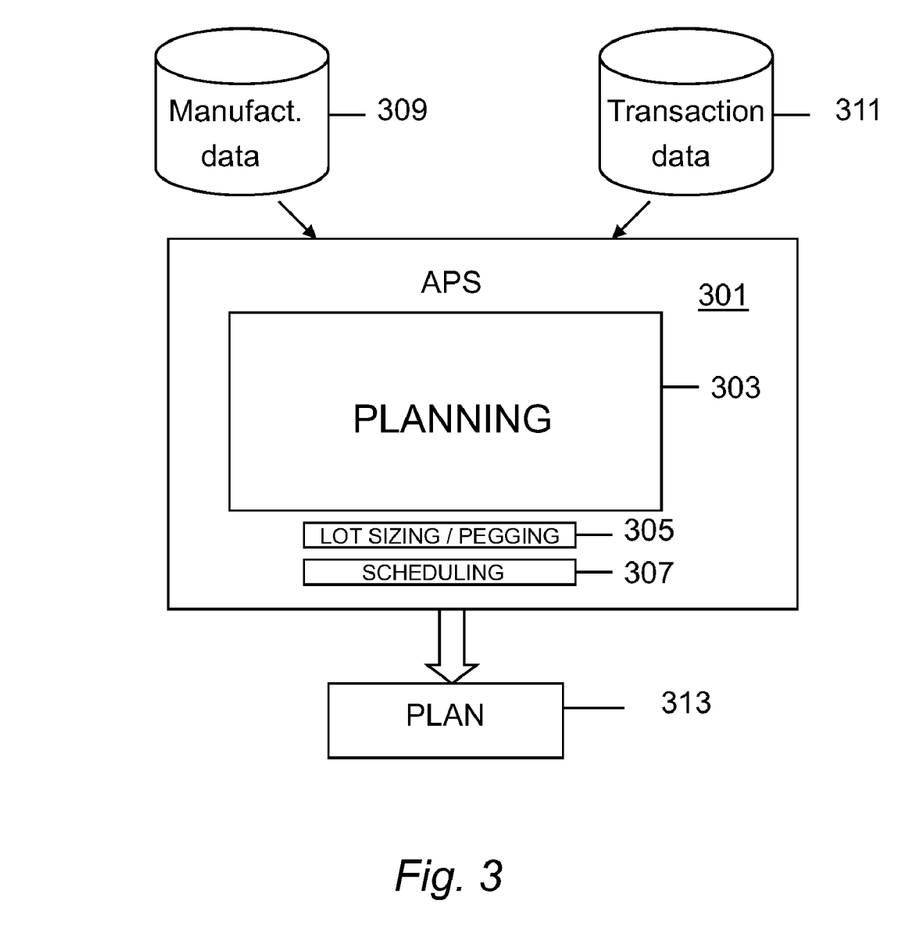
FIG. 3 shows a block diagram of a software architecture of a planning system of the embodiment.

Referring now to FIG. 3, a software architecture for implementing the method of an embodiment of the present disclosure is shown. A Planning module 303 receives data from a Manufacturing database 309 which provides information on materials, equipments, manufacturing process, expected service levels and from a Transaction database 311 which contains e.g. forecasts, demands, orders and due-dates. The Planning module 303 of an embodiment of the present disclosure could interact with other software modules, e.g. a Lot-sizing module 305, which creates production orders and links upstream and downstream production orders with material flow; and a Scheduling module 307, which determines when these production orders are executed and on which equipment. The above modules, Planning, Lot-sizing and Scheduling could be implemented together in an Advanced Planning System (APS) 301 as, for example, IBM ILOG PPO 3.2.

The planning method according to embodiments of the present disclosure can be applied to any kind of industry, however it finds particularly useful implementation in those kinds of industries where the stock must be kept at a minimum for both reduction of stock and inventory costs, where upstream and downstream equipments are highly synchronized, where intermediate buffers (e.g. tanks) have limited capacity, where materials are subject to maturity and shelf-life. Examples of such industries are the food and beverage industry, the fast-moving consumer goods industry, the pharmaceutical and chemical industries. In all these cases it is extremely important to guarantee the right size of stock is available at any time during production process.

The planning system according to embodiments of the present disclosure aims exactly at optimizing the stock and the production plan, avoiding both lack of stock when demand arrives and excessive stock which would increase storage costs, by means of an accurate linear programming as described in the following paragraphs.

According to an embodiment of the present disclosure, the scheduling and planning system is implemented in IBM ILOG Plant PowerOps 3.2, an integrated planning and scheduling tool specifically designed for the fast-moving consumer goods, for computing scheduling solutions and for interactive and dynamic rescheduling.

In an embodiment of the present disclosure, a user interface provides the possibility of modifying all input values in an easy and intuitive way.

Hereafter described is a basic production planning model and how the disclosure improves on the model. The case is not limitative at all, and embodiments of the present disclosure can work with much more complex models.

A production planning model is a decision-help tool used in manufacturing to help in deciding which materials to produce, when and how much. A material can be produced by different processes, each having different constraints and costs. Time is modeled as contiguous buckets, for which the model calculates average production values.

A Basic Production Planning Model

We use the following conventions:

m is a index ranging on materials, from 1 to M (the number of materials)

p is an index ranging on processes, from 1 to P (the total number of processes)

t is an index ranging on time buckets from 1 to T (the total number of time buckets)

Master Data of a Basic Production Planning Model

Master data describe the production facility; they are normally not subject to frequent changes.

minimum_batch_size[p] is the minimum quantity produced by a process p, whenever it produces material;

maximum_produced[p] is the maximum quantity produced by a process p;

demand_quantity[m,t] is the forecasted demand quantity for material m at period t;

stock_min[m,t] according to state of the art approach, this is a pre-computed minimum stock value for material m and time t. The method according to the present disclosure transforms this pre-computed value into a variable to be optimized together with the production plan, i.e.

the quantity of stock and the timing of the production are both adjusted by means of the lienear programming algorithm.

Decision Variables of a Basic Production Planning Model

For all p,t $Q_{p,t}$ is a continuous positive variable, which represents the quantity produced by process p at time For all p,t $Z_{p,t}$ is a binary variable equal to 1 if and only if $Q_{p,t}$ is non-zero, else equal to zero.

For all m,t $S_{m,t}$ is a positive continuous variable representing the inventory quantity of material m at t $D_{m,t}$ is a positive continuous variable representing the part of demand for m at t which is satisfied, For all m,t $U_{m,t}$ is a positive continuous variable representing the part of demand for m at t which is not satisfied.

Constraints of a Basic Production Planning Model

In this section we describe the linear constraints of the simplified production planning model. For a given material m, we will denote by P(m) the set of processes which produce m.

Resource Capacity constraints: the production of material m in bucket t has an upper bound $$Q_{p,t} \leq \text{maximum\_produced}[p]$$

The binary variables $z_{p,t}$ are linked to the production variables by the following equations:

$$z_{p,t} \text{minimum\_batch\_size}[p] \leq Q_{p,t} \leq z_{p,t} \text{maximum\_produced}[p]$$

Stock constraints: the stock at t is the sum of the stock before t, plus total quantity produced, minus demand satisfied.

$$\forall m, t \; S_{m,t} = S_{m,t-1} - D_{m,t} + \sum_{p \in P(m)} Q_{p,t}$$

Demand satisfaction constraints: each demand quantity is split between satisfied demand and unsatisfied demand.

$$\forall m,t \; \text{demand\_quantity}[m,t] = U_{m,t} + D_{m,t}$$

This basic set of constraints is just an example which should not be considered in any way limitative: the method according to the present disclosure can work with more complex production constraints (as in the real PPO model), containing, for instance, shelf-life and maturity constraints, setup constraints, campaign cycle constraints, etc. For sake of simplicity the following examples will only considered a simplified set of constraints.

Objective Function Minimized by the Production Planning Problem

A production planning model minimizes an objective function, which is defined as a weighted sum of elementary costs. To illustrate, a list of costs commonly described in the literature is provided, for instance:

Total non-delivery cost is the sum of all unsatisfied demand quantities, weighted by a non-delivery cost. This is usually the dominant term in the objective function. Failing to respect this constraint can affect very seriously the efficiency of the system, for this reason a very heavy weight is normally assigned to this value.

$$TotalNonDeliveryCost = K_{nd} \sum_{m,t} U_{m,t}$$

Stock deficit cost, is the sum of all positive deviations under the minimum stock, for all materials and time buckets.

$$TotalStockDeficitCost = K_{sd} \sum_{m,t} (\text{stock\_min}[m, t] - S_{m,t})^+$$

Process costs, represents the cost of producing, assumed to be proportional to the quantity produced $$TotalProcessCost = K_p \sum_{t} ProcessCost[p] Q_{p,t}$$

The objective function is then:

Objective=TotalNonDeliveryCost+TotalStockDeficitCost+TotalProcessingCost

Many other costs can be used in a production planning model, for instance: fixed processing costs, storage costs (to model warehouse costs), setup costs (to model costs for changing products), resource costs (to model resource usage cost), idleness costs, etc.

The list of costs should not considered in any way limitative; those skilled in the art will easily appreciate that the method according to the embodiment of the present disclosure here described can work with any other extra costs in the objective function.

Running a Production Planning Problem

The production planning model can be summarized as:
Minimize objective
Subject to: all production constraints described above.
Solving a production planning model requires a linear solver such as e.g. IBM ILOG Cplex. A linear solver computes an optimal solution to the planning problem; by optimal, it means that no other feasible plan has a lower objective value. The solver also outputs optimal values for all decision variables. In particular each production variable $Q_{p,t}$ is assigned an optimal value $q_{p,t}*$, which represents the optimal quantity produced by process p at time t.

The choice of the linear solver is by no way limitative, and the method according to the embodiment of the present disclosure here described can work with any other linear solver.

Minimum Stock

As mentioned above, according to the traditional (state of the art) approach, the safety stock to maintain in each time bucket is pre-computed and given to the mathematical model. Usually, the minimum stock is computed as a fixed number of days of supply. The cost function contains a term that penalizes the case where the planned inventory does not respect a minimum quantity that we call target stock which is composed of the average forecasted demand plus this safety stock. The target stock is thus an input data which computation is based on an average lead time.

According to several embodiments, the method according to the present disclosure removes the need of minimum stock data (as pre-computed input), by introducing decision variables for the minimum stock for material m at time t, denoted by $S_{m,t}^{min}$. The production planning model calculates optimal values of these new stock variables to protect against the risk of demand uncertainty, with a given target service level.

It is assumed that any actual stock value, smaller than the calculated optimal stock value, is lowering the actual service level below the target.

Figure 4:
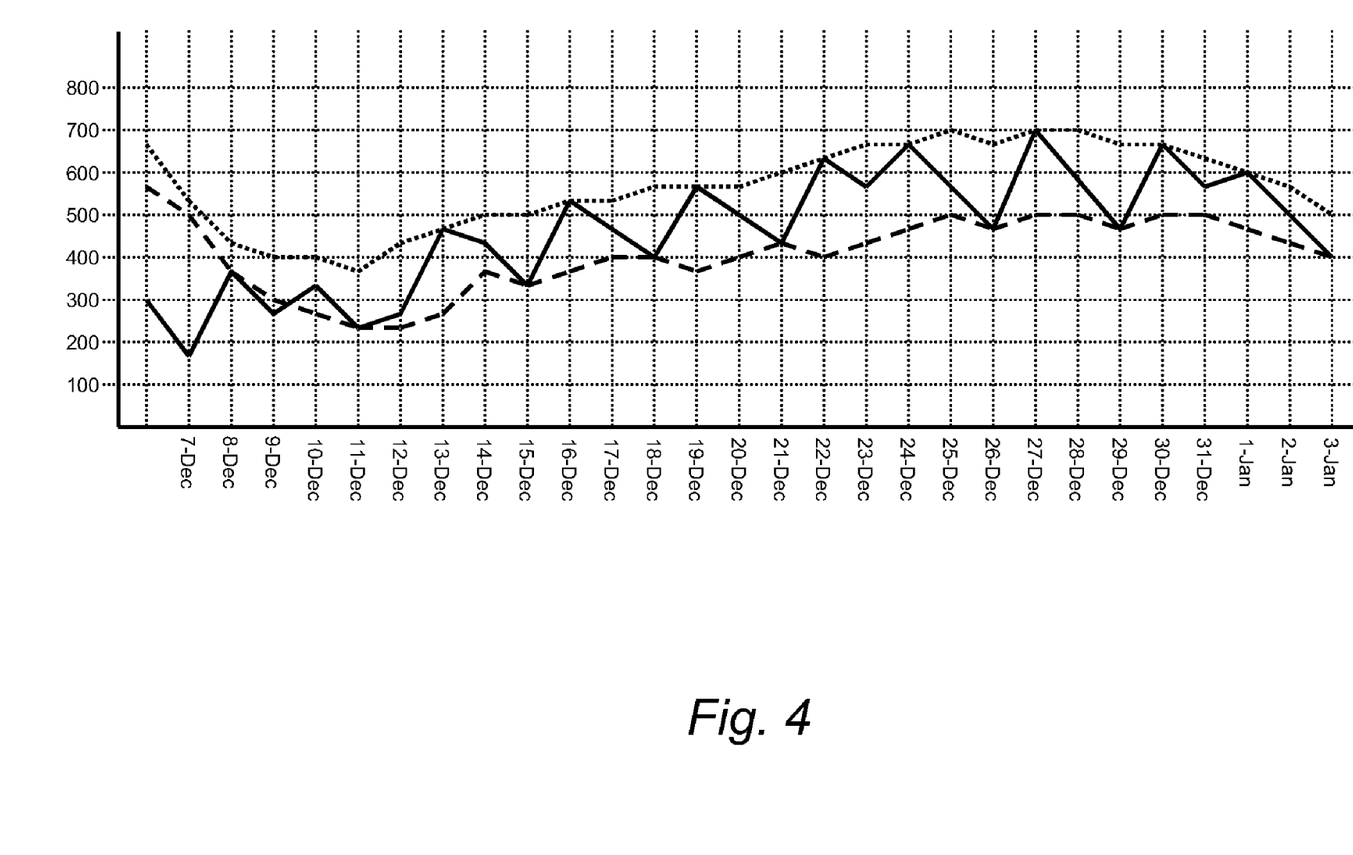
FIG. 4 shows an example of target stock calculation using a planning method according to a state of the art algorithm.
Figure 5:
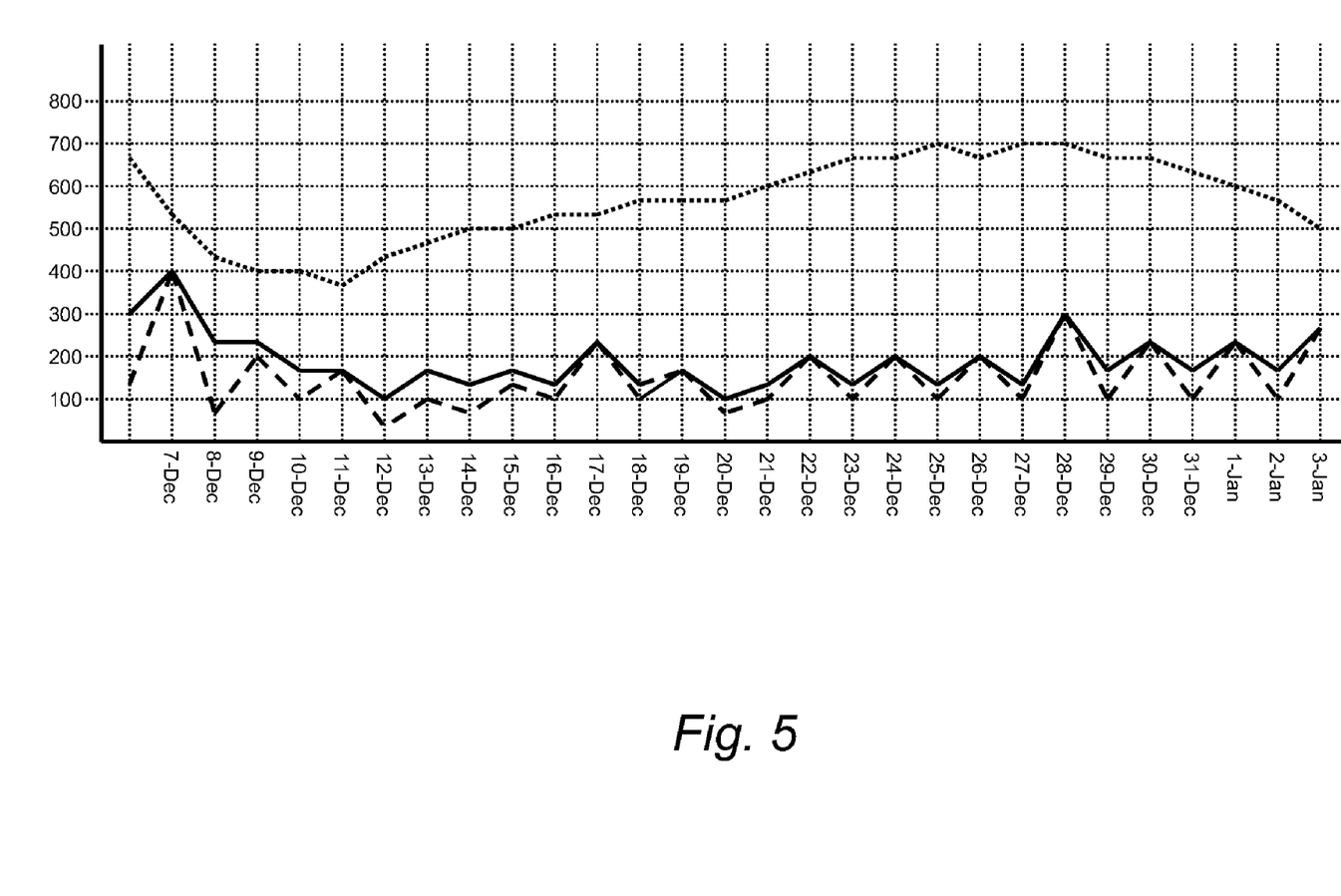
FIG. 5 shows an example of target stock calculation using a planning method according to an embodiment of the present disclosure.

As an example in FIGS. 4 and 5 we consider, as far as the food industry is concerned, an implementation of the planning system of the present disclosure to the production of a fresh dairy product. In both Figures, the dotted (upper) line represents the maximum stock, calculated as seven days of supply in both case; the broken line is the minimum stock, while the continuous line is the target production.

As shown in FIG. 4 the traditional safety stock approach is used to establish a minimum stock (as discussed above this assumption can work well only when demand is relatively stable and does not deviate very much from expected average. In this case the minimum stock is defined as three days of supply for all products and according to this (and the maximum stock) a target plan is calculated.

In the example shown in FIG. 5 the results obtained with the method according to an embodiment of the present disclosure are illustrated. The method used a fill-rate dynamic safety stock coupled with production plan calculation; the target service level is set to 98% of order quantity satisfaction. A relative forecast error of 50% is added for all materials. This means that a demand of 100 is assumed to follow a normal distribution with average value 100 and standard deviation 50. We can see that the resulting optimal minimum stock computed in this second example is much lower than the minimum stock computed from a fixed number days of supply. Though much lower, this safety stock still ensures, on average, 98% of demand quantity satisfaction should the demand vary, assuming such demand variations are consistent with our statistical data.

Coupling Target Stock Calculations to Production Decisions

The penalization of an inventory deficit is realized by subtracting the projected inventory to the decision variable $S_{m,t}^{min}$. These deviations are summed on all materials, to calculate the global stock deficit cost. The stock deficit cost in turn is part of the global objective minimized by the linear solver. Minimum safety stock variables being part of the global objective of the production planning model; they henceforth interact with the main production decision variables of the model.

Coupling from Production Decisions to Target Stock Calculations

Production variables are coupled to stock variables in order to take into account the actual date of the next production. The coupling is realized through binary variables $I_{m,t}$ that must be equal to one if the product m is produced in the bucket t and zero otherwise. In the PPO model, the coupling is realized using the $Z_{p,t}$ described in the simplified model above.

In the simple case where only one process is producing material m, then we have:

$$I_{m,t} = Z_{p,t}$$

If material m is produced by several processes p, then we have to express a logical or function of the producing processes, through the (classical) linear equations: $\forall p \in P(m)$, $I_{m,t} \geq z_{p,t}$, expressing that I equals one as soon as one producing process produces in t, $$I_{m,t} \leq \sum_{p \in P(m)} z_{p,t},$$

expressing that I is zero when all producing processes are not producing in t.

Taking into Account Demand Uncertainty

The stock decision variables not only take into account the date of next production but also take into account the forecast error of the demands. Demands are assumed to be random variables, following a normal ("bell curve") distribution. In this context, the data element demand_quantity[m,t] is interpreted as the average value of the demand. Using an extra data element, the standard deviation of the demand distribution, target stock calculations take into account random fluctuations of demands.

Additional Inputs to the System

In addition to the usual inputs to a production planning model, the method according to an embodiment of the present disclosure is provided with additional statistical data to be fed into the system:

the target cycle service level $\alpha_m$ or the target fill rate $\beta_m$ for any material m. The alpha and beta target service levels are two particular ways of estimating the risk of stock-out, widely discussed in the literature (see Van Ryzin publication cited above). However, those skilled in the art will appreciate that the method according to an embodiment of the present disclosure can work with other estimations of stock-out risks;

the forecasted demand in bucket t is assumed to follow a normal distribution law with average $D_{m,t}$ and standard deviation $\sigma_{m,t}$;

time of next production might be subject to statistical variations. As for demands, we will assume production time follows a normal distribution with a standard deviation $L_m$.

Additional Outputs from the System

Running a linear solver on the modified production problem also calculates the optimal target stock values, for each target stock variable $S_{m,t}^{min}$. This optimal stock value $S_{m,t}^{min,*}$ is the minimum inventory value which guarantees the target service level that was primarily given to the system. This is a major change from the usual approach, where minimum stock data have to be pre-computed and given to the system.

Target Stock Equations

The system computes an ideal stock target to cover the demand until the next production, and also the uncertainty, both in the demand and in the lead time (safety stock).

Usually, uncertainty is taken into account in a fixed period of time, but here we introduce decision variables to take it into account until the exact next production, as decided by the production planning MIP engine.

For a given bucket t, for all buckets k in the future of t, we state that, if no production occurs between t and k, the target stock must cover the total demand $$\sum_{j=t+1}^{k} D_{m,j}$$

plus the uncertainty, to guarantee a minimum target service level (a percentage between 0 and 100%). The precise semantics of this target service level may vary, depending on the type of risk we want to cover against.

Computing the Target Stock Based on Cycle Service-Level

A target cycle service level measures of probability of stock-out events, regardless of the missed quantity (see Van Ryzin publication cited above and incorporated herein by reference in its entirety). If the use chooses to provide a cycle target service level, the equations linking the target stock to production decision variables express that the target stock must take into account the accumulated average demand until next production, plus the safety stock, calculated to ensure a minimum cycle-service level:

$$\forall k \in [t+1; T] \; S_{m,t}^{min} \geq \qquad \text{Equation 1}$$

$$\left(1 - \sum_{j=t+1}^{k} I_{m,j}\right)\left(\sum_{j=t+1}^{k} D_{m,j} + K(\alpha_m)\sqrt{\left(\sum_{j=t+1}^{k} \sigma_{m,j}^2\right) + \lambda_{m,k}^2}\right)$$

Where
- $S_{m,t}^{min}$ is a continuous variable containing the target stock of material m at the end of time bucket t to hold in order to satisfy the target service level.
- $I_{m,t}$ is a binary variable indicating the production of material m in bucket t, coupled to the production decision variables, as described above.
- $K(\alpha_m)$ is called in the literature, the "service level factor" of the cycle service level a$\alpha_m$ defined as the inverse of the cumulative function of the normal distribution law (the cumulative function of the normal distribution law, usually denoted with $\Phi(\;)$, is defined as $$\Phi(z) = \int_{-\infty}^{z} p(t)dt,$$

where p(t) represents the unit normal distribution of t. It can be interpreted as the probability of a normal random variable to be less than z).

Aggregated demand from t to k also follows a normal distribution with mean value $$\sum_{j=t+1}^{k} D_{m,j}$$

and deviation $\sigma_{m,j}$ $\lambda_{m,t}$ denotes the standard deviation of the additional demand risk corresponding to the lead time variation and is computed as:

$$\lambda_{m,t} = L_m \times \left(\frac{D_{m,t}}{BucketDuration(t)}\right)$$

The additional demand risk corresponding to the production time deviation is approximated as the product of the average demand in the last bucket multiplied by the lead time deviation (a normal random variable with known deviation). The Term $$K(\alpha_m)\sqrt{\left(\sum_{j=t+1}^{k} \sigma_{m,j}^2\right) + \lambda_{m,k}^2}$$

is the safety stock part of the target stock.

Note that only S and I are decision variables in this set of equations, the other terms are data so the equation is linear.

For a given material and bucket index:
- the target stock increases when the next production is postponed to a future bucket.
- the target stock decreases when the next production is anticipated to an earlier bucket.

Computing the Target Stock Based on Fill Rate

Similarly, we can then write the fill-rate version of Equations 1, where service-level is interpreted as an average rate of demand quantity satisfaction:

The complete formula is given below:

$$\forall k \in [t+1; T] \qquad \text{Equation 2}$$

$$S_{m,t}^{min} \geq \left(1 - \sum_{j=t+1}^{k} I_{m,j}\right)\left(\sum_{j=t+1}^{k} D_{m,j} + \left(\sqrt{\left(\sum_{j=t+1}^{k} \sigma_{m,j}^2\right) + \lambda_{m,k}^2}\right)\right.$$

$$\left. UNL^{-1}\left((1-\beta_m)\left(\frac{\sum_{j=t+1}^{k} D_{m,j}}{\sqrt{\left(\sum_{j=t+1}^{k} \sigma_{m,j}^2\right) + \lambda_{m,k}^2}}\right)\right)\right)$$

Where
$UNL^{-1}$ denotes the inversion of the unit normal loss function (the Uniform Normal Loss function is defined as $$unl(z) = \int_{-\infty}^{z} (z-t)p(t)dt.$$

It can be interpreted as the expected value of the loss at z against a normal random variable).

Figure 6:
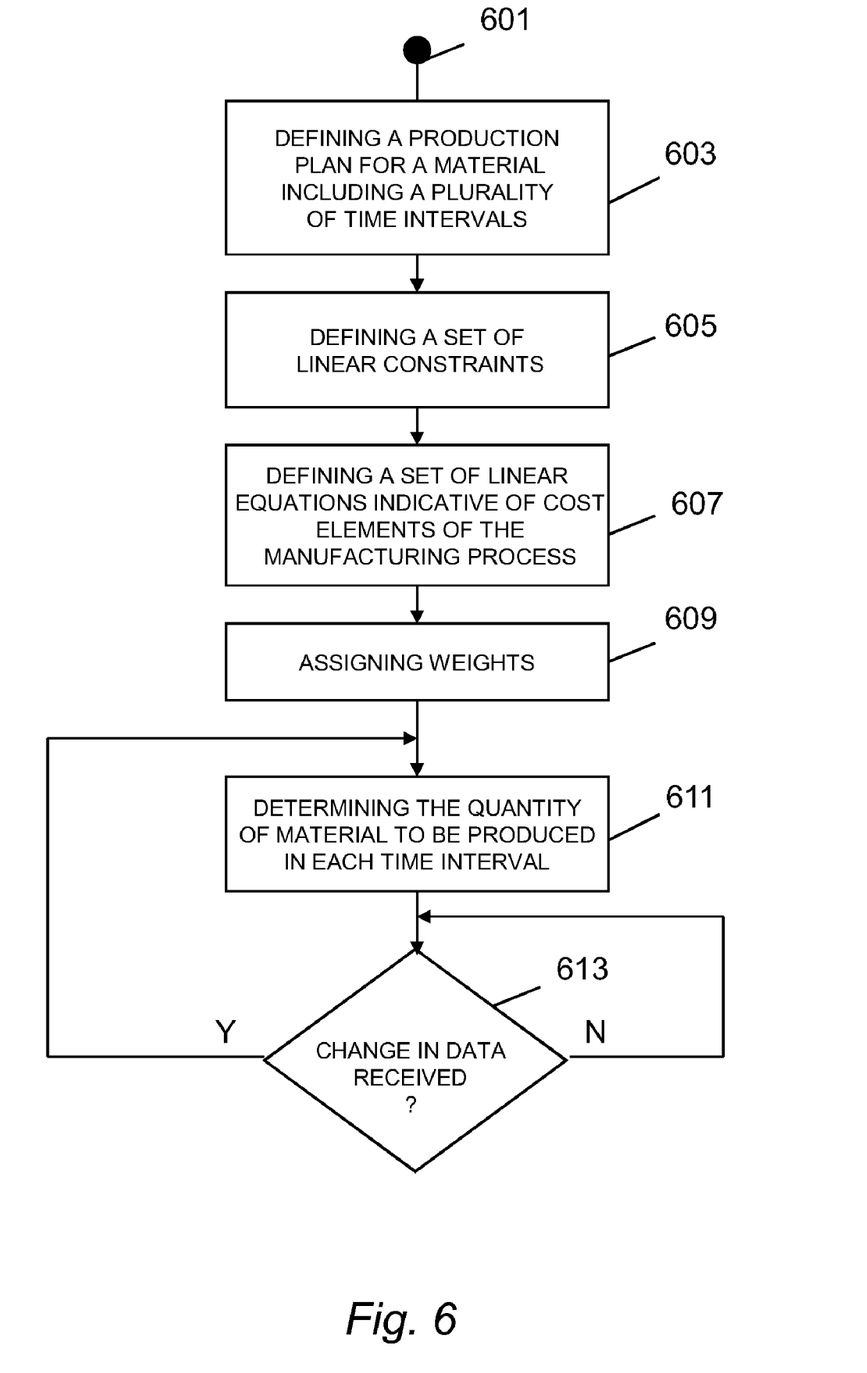
FIG. 6 shows a flowchart representing steps to perform a method according to the disclosure.

FIG. 6 schematically shows the method steps according to an embodiment of the present disclosure (600). The process starts at step 601 and goes directly at step 603 where a production plan for a material m is organized with a plurality of contiguous time intervals (or time buckets). At step 605 a set of linear constraints is defined while at step 607 a set of linear equations is defined, each one representing a cost value indicative of a cost element of the manufacturing process. Then a weight is assigned to each linear equation (step 609). These two steps allow the right determination of the importance given to the various costs of the manufacturing process. At step 611 the quantity $q_{m,T}$ of material m in a time interval T is calculated so that the sum of weighted costs defined by the linear equations is minimized. This step, according to an embodiment of the present disclosure, is performed by means of a Mixed Integer-linear Programming algorithm, using e.g. a linear solver SW such as e.g. IBM ILOG Cplex of International Business Machines Corp. At step 613 the system awaits for possible input which modify either the cost values or the assigned weights or any other master data (e.g. constraints). When such amendment is received or detected by the system, a new calculation (step 611) is performed to adjust the quantity $q_{m,T}$ and make sure that the target stock is in line with expected level. In an embodiment of the present disclosure, the most important cost is represented by the difference between the available stock and the demand request (or the forecast demand request): for this reason in such embodiment the weight assigned to the linear equation related to such a cost will be, by some margin, the heaviest of all weights. However, those skilled in the art will appreciate that different production environments might privilege other cost elements: in such case it is extremely easy to amend the "distribution" of weights among the costs by tuning the set of weights, or alternatively by introducing new linear equations representing different cost elements.

Alterations and modifications may be made to the above without departing from the scope of the invention. Naturally, in order to satisfy local and specific requirements, a person skilled in the art may apply to the solution described above many modifications and alterations.

In particular, although the present disclosure has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the disclosure may be incorporated in any other embodiment as a general matter of design choice.

For example, similar considerations apply if the computers have different structure or include equivalent units; in any case, it is possible to replace the computers with any code execution entity (such as a PDA, a mobile phone, and the like).

Similar considerations apply if the program (which may be used to implement each embodiment of the disclosure) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibres, wireless connections, networks, broadcast waves, and the like; for example, the medium may be of the electronic, magnetic, optical, electromagnetic, infrared, or semiconductor type.

The teachings according to the present disclosure can be carried out with a hardware structure (integrated, for example, in a chip of semiconductor material), or with a combination of software and hardware.

The invention claimed is:

1. A method for a batch manufacturing process for optimizing a production plan of at least one material m and the target stock of the at least one material m to satisfy the forecast of customer demands, the production plan being divided into a plurality of contiguous time intervals t, the manufacturing process including a plurality of process activities, each process activity producing a quantity $q_{m,T}$ of material m in a predetermined time interval T, the method comprising:
    defining for each at least one material m a set of N linear constraints $LC_{n,m}$, wherein $1<=n<=N$;
    defining for each at least one material m a set of linear equations, each linear equation representing a cost value $C_{z,m}$, wherein $1<=z<=Z$, each cost value indicative of a cost element of the batch manufacturing process, each linear equation being defined as a function of variable $q_{m,T}$;
    assigning to each cost value $C_{z,m}$ a weight $w_z$; and
    determining the value of $q_{m,T}$ for each time interval t so that the weighted sum of cost values $C_{z,m}$ is minimized while the linear constraints $LC_{n,m}$ are respected.

2. The method of claim 1 wherein the cost elements indicated by the cost values defined by the set of linear equations include one or more of the following:
    a non-delivery cost element related to a quantity of material m requested by a customer and not available in stock at any given time interval t;
    a stock deficit cost element related to the deviation between the actual inventory and the computed target inventory for each material m;
    a process cost element related to the quantity produced by each process in each time interval;
    a storage cost element related to the storage of stock;
    a set up cost element related to the change of product actually produced on a resource;
    a resource usage cost element related to the percentage of capacity of a resource being used by a process p in a time interval T;
    an idle resource cost element related to the percentage of capacity of a resource being idle in a time interval T;
    an earliness or lateness cost element related to the difference between the time when a customer demand is satisfied and the expected time of satisfaction.

3. The method claim 1 wherein the highest of the weight $w_z$ is assigned to a cost value indicative of the difference between the quantity of material available at a time T and the quantity requested to satisfy a forecast customer demand.

4. The method of claim 3 further comprising:
    responsive to an external input, modifying the forecast customer demand; and
    repeating the determining the value of $q_{m,T}$ for each time interval t so that the weighted sum of cost values $C_{z,m}$ is minimized.

5. The method of claim 1 further comprising:
    responsive to an external input, modifying any of constraints $LC_{n,m}$, cost value $C_{z,m}$, or weights $w_z$; and
    repeating the determining the value of $q_{m,T}$ for each time interval t so that the weighted sum of cost values $C_{z,m}$ is minimized.

6. The method of claim 1 wherein the set of linear constraints includes one or more of:
    a resource capacity constraint;
    for each process activity $p_t$ a minimum and a maximum material production quantity;
    a minimum and maximum number of batches produced;
    a stock constraint;
    a demand satisfaction constraint stating, for each demand, the amount of satisfied demand in each time interval;
    a shelf-life constraint;
    a maturity constraint;
    a manufacturing equipment set-up constraint;
    a material quality constraint;
    a campaign cycle constraint.

7. The method of claim 1 wherein the determining is performed using a Mixed Integer-linear Programming algorithm.

8. A system in a batch manufacturing process for optimizing a production plan of at least one material m and a target stock of the at least one material m, the production plan being divided into a plurality of contiguous time intervals t, the batch manufacturing process including a plurality of process activities, each activity producing a quantity $q_{m,T}$ of material m in a predetermined time interval T, wherein the system comprises:
    a computer with at least one processor and memory;
    a planning module executing in the memory of the computer, the module comprising program code enabled to perform:
    defining for each at least one material m a set of N linear constraints $LC_{n,m}$, wherein $1<=n<=N$;

defining for each at least one material m a set of linear equations, each linear equation representing a cost value $C_{z,m}$, wherein $1<=z<=Z$, each cost value indicative of a cost element of the batch manufacturing process, each linear equation being defined as a function of variable $q_{m,T}$;

assigning to each cost value $C_{z,m}$ a weight $w_z$; and determining the value of $q_{m,T}$ for each time interval t so that the weighted sum of cost values $C_{z,m}$ is minimized while the linear constraints $LC_{n,m}$ are respected.

9. A computer program product comprising a non-transitory computer readable storage medium storing computer readable program code that when executed in memory of a computer performs:

defining for each at least one material m a set of N linear constraints $LC_{n,m}$, wherein $1<=n<=N$;

defining for each at least one material m a set of linear equations, each linear equation representing a cost value $C_{z,m}$, wherein $1<=z<=Z$, each cost value indicative of a cost element of the batch manufacturing process, each linear equation being defined as a function of variable $q_{m,T}$;

assigning to each cost value $C_{z,m}$ a weight $w_z$; and determining the value of $q_{m,T}$ for each time interval t so that the weighted sum of cost values $C_{z,m}$ is minimized while the linear constraints $LC_{n,m}$ are respected.

10. The computer program product of claim 9 wherein the cost elements indicated by the cost values defined by the set of linear equations include one or more of the following:

a non-delivery cost element related to a quantity of material m requested by a customer and not available in stock at any given time interval t;

a stock deficit cost element related to the deviation between the actual inventory and the computed target inventory for each material m;

a process cost element related to the quantity produced by each process in each time interval;

a storage cost element related to the storage of stock;

a set up cost element related to the change of product actually produced on a resource;

a resource usage cost element related to the percentage of capacity of a resource being used by a process p in a time interval T;

an idle resource cost element related to the percentage of capacity of a resource being idle in a time interval T;

an earliness or lateness cost element related to the difference between the time when a customer demand is satisfied and the expected time of satisfaction.

11. The computer program product of claim 9 wherein the highest of the weight $w_z$ is assigned to a cost value indicative of the difference between the quantity of material available at a time T and the quantity requested to satisfy a forecast customer demand.

12. The computer program product of claim 11 further comprising:

responsive to an external input, modifying the forecast customer demand; and repeating the determining the value of $q_{m,T}$ for each time interval t so that the weighted sum of cost values $C_{z,m}$ is minimized.

13. The computer program product of claim 9 further comprising:

responsive to an external input, modifying any of constraints $LC_{n,m}$, cost value $C_{z,m}$, or weights $w_z$; and repeating the determining the value of $q_{m,T}$ for each time interval t so that the weighted sum of cost values $C_{z,m}$ is minimized.

14. The computer program product of claim 9 wherein the set of linear constraints includes one or more of:

a resource capacity constraint;

for each process activity $p_t$ a minimum and a maximum material production quantity;

a minimum and maximum number of batches produced;

a stock constraint;

a demand satisfaction constraint stating, for each demand, the amount of satisfied demand in each time interval;

a shelf-life constraint;

a maturity constraint;

a manufacturing equipment set-up constraint;

a material quality constraint;

a campaign cycle constraint.

15. The computer program product of claim 9 wherein the determining is performed using a Mixed Integer-linear Programming algorithm.

* * * * *